(12) United States Patent
Koelle

(10) Patent No.: US 10,756,476 B2
(45) Date of Patent: Aug. 25, 2020

(54) SEALED ELECTRICAL PLUG CONNECTOR ARRANGEMENT

(71) Applicant: Molex Connectivity GMBh, Walldorf (DE)

(72) Inventor: Bernd Koelle, Brackenheim (DE)

(73) Assignee: Molex Connectivity GmbH, Walldorf (DE)

( * ) Notice: Subject to any disclaimer, the term of this patent is extended or adjusted under 35 U.S.C. 154(b) by 0 days.

(21) Appl. No.: 16/089,810

(22) PCT Filed: Mar. 29, 2017

(86) PCT No.: PCT/EP2017/057370
§ 371 (c)(1),
(2) Date: Sep. 28, 2018

(87) PCT Pub. No.: WO2017/167785
PCT Pub. Date: Oct. 5, 2017

(65) Prior Publication Data
US 2019/0115686 A1    Apr. 18, 2019

(30) Foreign Application Priority Data
Mar. 30, 2016   (DE) .................. 10 2016 105 725

(51) Int. Cl.
*H01R 13/52* (2006.01)
*H01R 9/24* (2006.01)
(Continued)

(52) U.S. Cl.
CPC ....... *H01R 13/5202* (2013.01); *B23K 1/0016* (2013.01); *B23K 1/19* (2013.01);
(Continued)

(58) Field of Classification Search
None
See application file for complete search history.

(56) References Cited

U.S. PATENT DOCUMENTS

| 5,735,697 A * | 4/1998 | Muzslay | H01R 12/57 439/83 |
| 6,552,911 B1 | 4/2003 | Haupt et al. | |

(Continued)

FOREIGN PATENT DOCUMENTS

| DE | 4344904 A1 | 8/1995 |
| DE | 102 56 374 B3 | 7/2004 |

*Primary Examiner* — Xuong M Chung Trans
(74) *Attorney, Agent, or Firm* — Molex Connectivity GmbH

(57) ABSTRACT

The invention relates to an electrical connection arrangement for producing a detachable electrical connection with one or more plug connectors, wherein the connection arrangement comprises the following: a. a housing which forms at least one housing wall in which there are one or more preferably cylindrical openings; b. one or more plug connectors, each of which has a cylindrical plug connector housing protruding through an opening; c. wherein a contact carrier carrying a contact is arranged in each of the cylindrical plug connector housing(s), the contact connections of which are on a common mounting plane for electrically contacting a circuit board, d. wherein the housing wall of the housing is integrally bonded to the cylindrical plug connector housing(s) via their outer casing.

13 Claims, 2 Drawing Sheets

(51) Int. Cl.
*H01R 13/504* (2006.01)
*B23K 1/00* (2006.01)
*B23K 1/19* (2006.01)
*B23K 26/28* (2014.01)
*B23K 101/42* (2006.01)

(52) U.S. Cl.
CPC ........... *B23K 26/28* (2013.01); *H01R 9/2491* (2013.01); *H01R 13/504* (2013.01); *B23K 2101/42* (2018.08)

(56) References Cited

U.S. PATENT DOCUMENTS

| | | |
|---|---|---|
| 7,568,932 B2 | 8/2009 | O'Connor |
| 8,096,827 B2 | 1/2012 | Kleinkorres |
| 8,172,583 B2 | 5/2012 | Friedrich |
| 9,570,868 B2 | 2/2017 | Kleinke |
| 10,044,122 B2 * | 8/2018 | Liskow .................. H01R 12/55 |
| 10,251,297 B2 * | 4/2019 | Manushi ................ H05K 1/181 |

* cited by examiner

SEALED ELECTRICAL PLUG CONNECTOR ARRANGEMENT

RELATED APPLICATIONS

This application claims priority to International Application No. PCT/EP2017/057370, filed Mar. 29, 2017, which claims priority to German Patent Application No. 10 2016 105 725.8, filed Mar. 30, 2016, both of which are incorporated herein by reference in their entirety.

TECHNICAL FIELD

The invention relates to an electrical connection arrangement for producing a releasable electrical connection with one or a plurality of plug connectors, and to a method for producing such a connection arrangement.

BACKGROUND ART

Connection arrangements are known in the prior art for many applications. The present invention is concerned with sealed connection arrangements such as coupling device for coupling devices such as sensors, actuators or controllers to a bus system.

In many electronic applications today, different devices communicate with each other via a bus system. In this case, a plurality of different bus systems based on different communication protocols is also known in the prior art. In the field of electronic surveillance systems, for example, the distribution of so-called safety bus systems, which are partly based on standard fieldbus protocols, is increasing.

DE 43 44 904 A1, for example, discloses a connection system for connecting both simple sensors or actuators with parallel signal transmission, as well as complex sensors or actuators with serial signal transmission to an fieldbus-specific fieldbus circuit of a respective fieldbus system, which fieldbus circuit precedes a fieldbus-independent interface device to which either simple or complex sensors or actuators can be connected.

SUMMARY

To connect the devices, therefore suitable interfaces or prefabricated electrical connection arrangements are necessary. These are installed in so-called IO-links or Ethernet boxes, for example.

Due to the large number of devices, every device that can be a sensor, actuator or controller, for example, must be equipped with a wide variety of bus interfaces for a comprehensive offering. The more bus systems exist and have to be covered, the higher the development and manufacturing costs of corresponding devices. A particular problem is the assembly, since with an increasing number of interfaces and thus increasing size of the connection arrangements, the problem of tightness of the entire arrangement also increases. Due to the diverse positions of the individual plug connectors which are typically used as a circular plug connector in such applications, the problem of housing the junction boxes accordingly arises due to the manufacturing-related tolerances. In addition to the assembly of the plug connector, also the connection of the plug connector with a circuit board may cause difficulties.

This is in many cases no longer economical and safe, so that on the one hand, a reduction in the cost of developing and manufacturing the device is desired, and on the other hand increasingly large and diversely populated connection arrangements can be made sufficiently sealed against environmental influences.

In the current systems known in the prior art, a high tolerance requirement must be met, so that after assembly of the plug connector, an overall sealed arrangement with all involved seals is created. Due to the various successive assembly steps of various components involved, however, this is complicated, especially with a high number of interfaces or connectors to be accommodated. Due to production-related positional deviations between the plug connector and the circuit board on the one hand, and between the plug connectors and the housing on the other hand, which are influenced in particular by the hole dimensions in the housing and its tolerance layers, the cost-effective production of such connection arrangements is difficult.

Based on the prior art, it is therefore an object of the present invention to overcome the aforementioned disadvantages and to provide a simplified and inexpensive to produce electrical connection arrangement for producing a detachable electrical connection with one or a plurality of connectors, and a method for producing such a connection arrangement, in particular in which the production of a sealed arrangement can be realized in a simple manner.

This object is achieved by the combination of features according to claim 1 and claim 11.

A basic idea of the present invention is that the positions of the connectors in the housing, taking into account the production-related tolerance fields, correlate with the housing in such a way that the connectors can first be mounted on a printed circuit board, and then the entire assembly of the printed circuit board assembly into the housing can take place. Further, the invention provides that the materials of the housing and the plug connector housing allow a integrally bonded connection. In the assembly step of the circuit board in the housing, a small gap remains between the respective plug connector housings and the housing wall of the housing, which is closed, however, by means of an integrally bonded connection method, wherein simultaneously the mechanical connection between the circuit board and the housing in which the circuit board is housed and the complete sealing of the housing in the area of the housing openings.

Therefore, according to the invention, there is an electrical connection arrangement for making a releasable electrical connection with one or more plug connectors, wherein the connection arrangement has the following: a housing forming at least one housing wall in which one or more, preferably cylindrical openings are provided and one or more plug connectors, that each protrude through a hole with a cylindrical plug connector housing, wherein in the cylindrical plug connector housing(s), a contact-carrying contact carrier is arranged in each case, with contact terminals on a common mounting plane for electrical contact with a circuit board, wherein the housing wall of the housing with the cylindrical plug connector housing(s) is integrally bonded via their outer jacket.

It is also advantageous if, further, a circuit board is provided adjacent to the housing wall to which the contacts are electrically connected, preferably soldered directly to the circuit board. The soldering can be produced by classical known soldering methods. In this way, the entire solder assembly is positioned relative to the housing, mechanically fastened and further also sealed by the integral bond between the housings.

In a preferred embodiment of the invention, it is provided that the housing further consists of a metallic material, preferably of steel, more preferably of a stainless steel.

It is further preferred, if also the plug connector housing (s) are made of the same or a similar metallic material, preferably of steel, more preferably of a stainless steel.

In a likewise preferred embodiment of the invention, it is provided that the integral bond between the housing and the plug connector housings is realized by means of a welded connection. It is particularly advantageous to provide a laser welding. For this purpose, it was necessary to provide specific adjustments to the gap dimension, the geometry of the components involved and a protective collar (circumferential collar), so that, during laser welding, the laser beam does not damage other components.

It is preferably provided that a gap, preferably a circumferential gap, is formed or properly provided between the outer jacket of a plug connector housing and the inner wall surrounding the outer jacket in the region inside the preferably cylindrical opening in the housing wall. The selected or resulting gap width is determined as a function of the tolerance field of the printed circuit board mounting assembly in relation to the tolerance field of the openings in the housing. If the position of the plug connectors on the printed circuit board varies by a factor x relative to the theoretically exact position, then the respective opening in terms of the theoretically exact position is increased in diameter by the corresponding factor x/2 and additionally by the gap dimension y with respect to the theoretically exact outer diameter, wherein the gap dimension y must be selected to be greater, the higher the number of provided adjacent or sequential plug connectors in a direction of the housing.

It is also advantageous if each plug connector housing further comprises a circumferential collar which projects laterally beyond the preferably cylindrical opening. In this respect, it is advantageous if the width of the respective collar exceeds at least the gap dimension y. By completely covering or closing the gap to the interior of the housing, a breakdown in the joining process, in particular during welding is prevented, which may result through the gap up to the circuit board, if the gap remained open.

In a likewise preferred embodiment of the invention, it is provided that each plug connector housing has a stop with which the respective plug connector housing rests in the axial direction against the housing wall of the housing.

It is preferable if the individual plug connector housings are formed with a locking geometry, preferably with an internal or external thread, in order to secure a correspondingly formed plug connector on it, as soon as it has been brought into its plug-in position with the housing-side plug connector.

In a further preferred embodiment of the invention, it is provided that the housing is formed completely peripherally closed as a sealed housing, wherein each additional housing opening is sealed by a seal against ingress of moisture and dirt.

A further aspect of the present invention relates to a method for producing an electrical connection arrangement as described above with the following steps:

a) Mounting and electrically connecting the plug connector(s) to a circuit board;

b) Inserting openings in a housing wall of a housing according to the respective mounting positions and the respective outside diameter of the plug connectors;

c) Positioning the circuit board relative to the housing such that the plug connector with its plug connector housing projects through a respective opening through the housing wall, and d) Producing an integral bond between the housing wall and the respective plug connector housing.

In an advantageous embodiment of the method according to the invention, it is provided that the integral bond is produced by a welding process, preferably by a laser sonic welding process. In principle, any suitable conventional welding method can be used for this if a circumferentially closed integral bond between the housing and the plug connector housing is thereby possible, even with a high packing density.

The method is further advantageous when the integral bond therefore runs completely circumferentially between the outer shell and the housing wall so that the housing is sealed against the ingress of moisture. In this skillful way, both a positioning, a mechanical connection and a seal can be achieved by means of the integral bond.

Other advantageous developments of the invention are characterized in the dependent claims or are presented in more detail below together with the description of the preferred embodiment of the invention with reference to the figures.

DETAILED DESCRIPTION OF THE PREFERRED EMBODIMENTS

Figure 1:
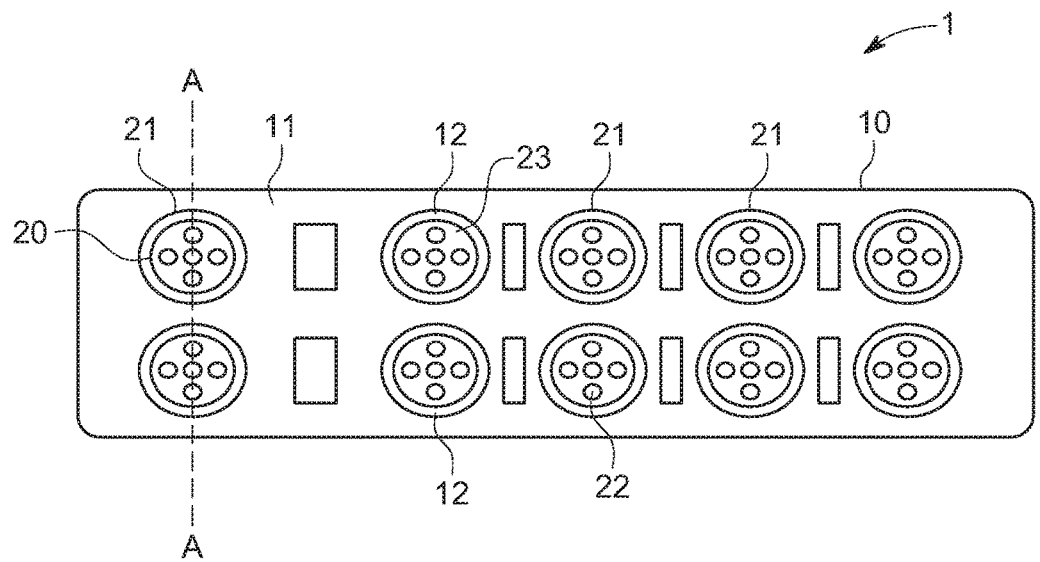
FIG. 1 a plan view of a schematic embodiment of a plug connection arrangement.

In the following, the invention will be described in more detail with reference to FIGS. 1 to 4, wherein like reference numerals refer to the same functional and/or structural features.

FIG. 1 shows a plan view of a schematic embodiment of an electrical connection arrangement 1 for producing a releasable electrical connection with a plurality (here with 10) of corresponding connectors (not shown).

The connection arrangement 1 comprises a housing 10 which forms an upper housing wall 11, in which ten cylindrical openings 12 are provided. Through the openings 12 extend connectors 20, each protruding with a cylindrical plug connector housing 21 through one of the openings 12, as shown in the sectional view in FIG. 2.

Figure 2:
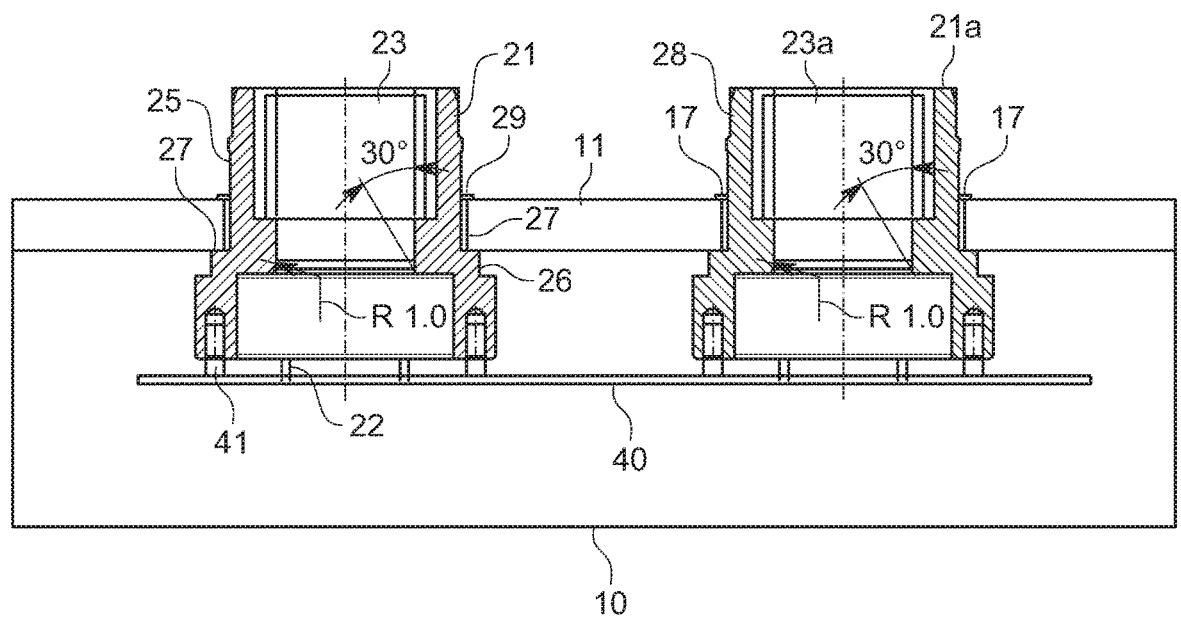
FIG. 2 a sectional view of the plug connection arrangement according to FIG. 1, and FIG. 3 an isometric view of a plug connector housing from the connection arrangement of FIGS. 1 and 2, and FIG. 4 a sectional view of the plug connector housing of FIG. 3.

The sectional view of FIG. 2 corresponds to a view along the section line A-A of FIG. 1. The contact chambers with the contacts have been omitted in FIG. 2 for clarity.

The cylindrical plug connector housings 21 each have arranged therein a terminal retainer 23 carrying terminals 22 having terminal connection ends that are located in a common mounting plane for electrical contacting with a circuit board 40.

The upper housing wall 11 of the housing 10 is in each case integrally bonded to the ten cylindrical plug connector housings 21 via their outer casing 25. The integral bond 29 is designed as a kind of annular connection between the housing 10 and the respective plug connector housing 21. As can be seen further, the plug connector housings 21 extend upward, wherein the terminal retainer 23 extends with its plug-side end face 23a approximately to the upper edge 21a of the respective plug connector housing 21.

Further, FIG. 2 shows a circuit board 40 adjacent to the housing wall 11 to which the terminals 22 are electrically connected, preferably soldered directly to the circuit board 40.

The housing 10 and the plug connector housings 21 further consist of a metallic material, and in the present case a corrosion-resistant stainless steel, wherein the integral bond 29 between the housing 10 and the plug connector housings 21 is realized by means of a welded connection.

As can also be seen in FIG. 2, between the outer casing 25 of a plug connector housing 21 and an inner wall surrounding the outer casing 25 there is a gap 17 in each case in the region inside the preferably cylindrical opening 12 in the housing wall 11, in the present case designed as a circumferential annular gap.

Figure 4:
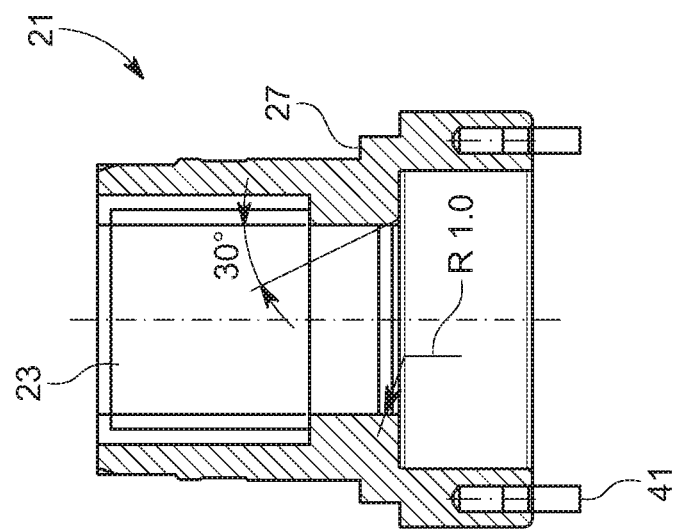
Figure 3:
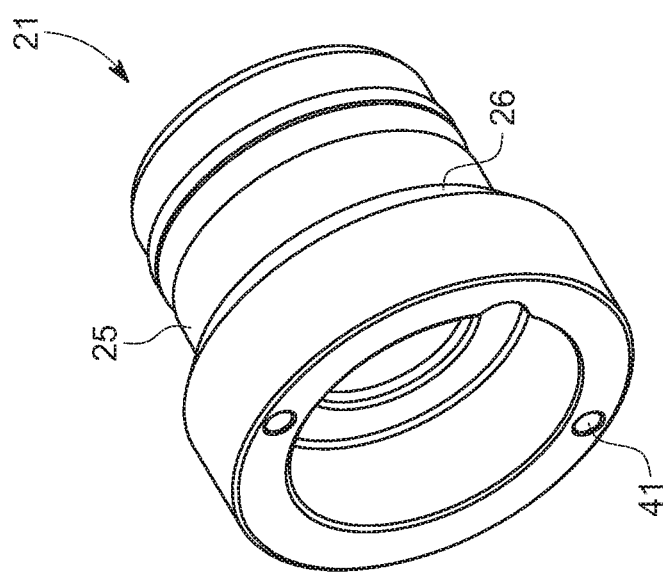

Furthermore, as can be seen in FIGS. 3 and 4, each plug connector housing 21 has a circumferential collar 26. This collar 26 protrudes in the assembled state of the plug connector housing 21 laterally beyond the respective cylindrical opening 12, as can be seen in FIG. 2. However, FIG. 3 does not show the contact carrier, but only the plug connector housing 21 in an isometric view. At the bottom there are contact openings for the introduction of ground contacts in order, for example, to bring a ground or shield connection 41 via the metallic plug connector housing 21 to the circuit board starting from the metallic housing 10.

Each plug connector housing 21 further has a stop 27, with which the respective plug connector housing 21 abuts in the axial direction against the underside of the upper housing wall 11 of the housing 10.

The plug connector housings 21 are further formed with a locking geometry 28, in the present case with an external thread to attach thereto a correspondingly shaped plug connector, which is mated with the respective plug connector 20, once this has been brought into its plugged position with the housing-side plug connector 20.

The housing 10 is a fully circumferentially closed sealed housing, wherein housing cover that is sealed by a seal against the housing 10 is provided removably on the underside for protection against ingress of moisture and dirt.

The shown electrical connection arrangement 1 is produced according to the at least following steps:

a) Mounting and electrically connecting the ten plug connectors 20 to a circuit board 40, preferably using a solder mask;

b) Inserting openings 12 into the upper housing wall 11 of a housing 10 corresponding to the respective mounting positions and the respective outer diameter of the connectors 20, preferably in correspondence with the solder mask of step a concerning the ten connectors;

c) Positioning the circuit board relative to the housing 10 such that the plug connectors 20 protrude with their plug connector housings 21 through the openings 12 in the housing wall 11 corresponding to their position, and preferably abut with the stop 27 against the underside of the housing 10 and the housing wall 11, and d) Producing a circumferential integral bond 29 between the housing wall 11 and the respective plug connector housing 21, preferably by means of welding, more preferably by a laser sonic welding process.

The invention is not limited in its execution to the above-mentioned preferred embodiments. Rather, a number of variants is conceivable which makes use of the illustrated solution even with fundamentally different types of execution.

The invention claimed is:

1. An electrical connection arrangement for establishing a detachable electrical connection with a plurality of connectors, the electrical connection arrangement comprising:
a housing made of metallic material and defining a housing wall in which a plurality of cylindrical openings are provided;
a plurality of circular connectors, each circular connector having a cylindrical connector housing made of metallic material and protruding through one of the openings;
wherein the cylindrical connector housings each have arranged therein a terminal retainer carrying terminals having terminal connection ends that are located in a common mounting plane and electrically connected to a printed circuit board,
wherein the cylindrical connector housings each have an abutment through which the respective cylindrical connector housing is axially abutting on the housing wall of the housing, and wherein a circumferential gap is provided inside the respective cylindrical opening in the housing wall between an outer lateral surface of the respective connector housing and an inner surface annularly surrounding the outer lateral surface, and wherein the housing wall of the housing is joined, through a material bond, to the outer lateral surface of the cylindrical connector housings, namely by a weld connection between the outer lateral surface and the housing wall and which is completely annularly extending around the opening at a side of the housing wall opposite the abutment.

2. The electrical connection arrangement according to claim 1, wherein the printed circuit board is adjacent to the housing wall the terminal connection ends are soldered directly to the printed circuit board.

3. The electrical connection arrangement according to claim 1, wherein the housing is made of steel.

4. The electrical connection arrangement according to claim 3, wherein the housing is made of stainless steel.

5. The electrical connection arrangement according to claim 1, wherein each cylindrical connector housing is made of steel.

6. The electrical connection arrangement according to claim 5, wherein each cylindrical connector housing is made of stainless steel.

7. The electrical connection arrangement according to claim 1, wherein each cylindrical connector housing has a circumferential collar which projects laterally beyond the opening.

8. The electrical connection arrangement according to claim 1, wherein each cylindrical connector housing is formed with a locking geometry, preferably with an internal or external thread, which is configured to fix a correspondingly formed connector thereto.

9. The electrical connection arrangement according to claim 1, wherein the housing is formed completely circumferentially closed as a sealed housing, wherein each further housing opening is sealed by a seal against ingress of moisture and dirt.

10. A method for producing an electrical connection arrangement according to claim 1, the method comprising the following steps:
a. mounting and electrically connecting the circular connectors to the printed circuit board;

b. inserting openings in the housing wall of the housing corresponding to the respective mounting positions and the respective outside diameter of the circular connectors;
c. positioning the printed circuit board relative to the housing such that the circular connector with its cylindrical connector housing projects through a respective opening through the housing wall, and
d. producing a material bond between the housing wall and the respective cylindrical connector housing.

11. The method according to claim 10, wherein the material bond is produced by a welding process.

12. The method according to claim 10, wherein the material bond extends completely circumferentially between the outer casing and the housing wall so that the housing is sealed against ingress of moisture.

13. The method according to claim 11, wherein the material bond is produced by a laser sonic welding process.

* * * * *